United States Patent
Hasegawa

(10) Patent No.: US 8,384,342 B2
(45) Date of Patent: Feb. 26, 2013

(54) FUEL CELL SYSTEM AND CONTROL METHOD THEREOF

(75) Inventor: Junichi Hasegawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 303 days.

(21) Appl. No.: 12/865,452

(22) PCT Filed: Feb. 19, 2009

(86) PCT No.: PCT/IB2009/000301
§ 371 (c)(1),
(2), (4) Date: Jul. 30, 2010

(87) PCT Pub. No.: WO2009/106949
PCT Pub. Date: Sep. 3, 2009

(65) Prior Publication Data
US 2010/0320960 A1   Dec. 23, 2010

(30) Foreign Application Priority Data
Feb. 25, 2008   (JP) ................ 2008-043207

(51) Int. Cl.
*H01M 8/04* (2006.01)
*H01M 8/00* (2006.01)
*H01M 8/10* (2006.01)

(52) U.S. Cl. ........ 320/101; 429/442; 429/422; 429/413; 429/414

(58) Field of Classification Search .................. 320/101; 429/429, 442
See application file for complete search history.

(56) References Cited

U.S. PATENT DOCUMENTS

| 5,948,221 A | * | 9/1999 | Hsu ............................... 204/270 |
| 2004/0013923 A1 | * | 1/2004 | Molter et al. .................... 429/25 |
| 2006/0035122 A1 | * | 2/2006 | Weissman et al. .............. 429/26 |
| 2006/0292410 A1 | * | 12/2006 | Kaupert et al. ................ 429/20 |
| 2009/0176135 A1 | * | 7/2009 | Saito et al. ...................... 429/17 |

FOREIGN PATENT DOCUMENTS

| DE | 10 2004 005 935 A1 | 8/2005 |
| JP | 2002-117876 | 4/2002 |
| JP | 2002-313388 | 10/2002 |
| JP | 2004-165058 | 6/2004 |
| JP | 2005-190744 | 7/2005 |
| JP | 2006-294499 | 10/2006 |
| JP | 2007-172951 | 7/2007 |
| JP | 2007-188826 | 7/2007 |

* cited by examiner

*Primary Examiner* — M'Baye Diao
(74) *Attorney, Agent, or Firm* — Drinker Biddle & Reath LLP

(57) ABSTRACT

The present invention provides a fuel cell system including a fuel cell configured to cause reactant gas to be electrochemically reacted to generate electrical power when the reactant gas is supplied to the fuel cell, power consuming equipment such as a reactant gas supply apparatus and a heating device operable to consume electrical power generated by the fuel cell, and a controller for controlling operation of the fuel cell system. During a warm-up operation, the controller causes the reactant gas supply apparatus to start a flow of the reactant gas and to increase the flow of the reactant gas over time, such that the reactant gas supply device starts to consume power and consumes increased power over time. After starting the flow of the reactant gas, the controller causes the heating device to start heating the coolant such that the heating device consumes power.

19 Claims, 7 Drawing Sheets

FUEL CELL SYSTEM AND CONTROL METHOD THEREOF

CROSS-REFERENCE TO RELATED APPLICATIONS

This application claims priority to Japanese Patent Application No. 2008-043207 filed Feb. 25, 2008, which is incorporated by reference herein in the entirety.

BACKGROUND OF THE INVENTION

1. Field of the Invention

The present invention relates to a fuel cell system and a control method of the fuel cell system.

2. Description of the Related Art

A fuel cell system having a fuel cell has been known. In the fuel cell, fuel gas (for example, hydrogen) is supplied to a fuel electrode, and oxidizing gas (for example, air) is supplied to an oxidizer electrode. The gases are electrochemically reacted with each other to generate power. Such a fuel cell system may perform a warm-up operation in order to improve starting of the system in a cool-temperature environment.

For example, Japanese Unexamined Patent Application Publication No. 2002-313388 discloses a method of decreasing power generation efficiency by decreasing a supply flow rate of reactant gas to a fuel cell while starting in the cool-temperature environment. With this method, the temperature of the fuel cell can be increased, thereby decreasing a warm-up time of the fuel cell.

SUMMARY OF THE INVENTION

The present invention is made in light of the above situations, and an object of the present invention is to provide a method of promoting warming-up of a fuel cell when starting in a cool-temperature environment.

In one embodiment, the present invention provides a fuel cell system including a fuel cell configured to cause reactant gas to be electrochemically reacted to generate electrical power when the reactant gas is supplied to the fuel cell. The fuel cell system further includes power consuming equipment operable to consume electrical power generated by the fuel cell. The power consuming equipment includes a reactant gas supply apparatus configured to supply the reactant gas to the fuel cell and a heating device configured to heat coolant supplied to the fuel cell. The system further includes a controller for controlling operation of the fuel cell system. During a warm-up operation, the controller causes the reactant gas supply apparatus to start a flow of the reactant gas and to increase the flow of the reactant gas over time such that the reactant gas supply apparatus starts to consume power and consumes increased power over time. Additionally, after the flow of the reactant gas is started, the controller causes the heating device to start heating the coolant supplied to the fuel cell such that the heating device consumes power.

In another embodiment, the present invention provides a method for controlling a fuel cell system during a warm-up operation, the fuel cell system including a fuel cell configured to cause reactant gas to be electrochemically reacted to generate electrical power when the reactant gas is supplied to the fuel cell and power consuming equipment operable to consume electrical power generated by the fuel cell, the power consuming equipment including a reactant gas supply apparatus configured to supply the reactant gas to the fuel cell and a heating device configured to heat coolant supplied to the fuel cell. The method includes starting a flow of the reactant gas such that the reactant gas supply apparatus consumes power, increasing the flow of the reactant gas over time such that the power consumed by the reactant gas supply apparatus increases over time, and after the flow of the reactant gas is started, heating the coolant supplied to the fuel cell such that the heating device consumes power.

In another embodiment, the present invention provides a fuel cell system including a fuel cell configured to cause reactant gas to be electrochemically reacted to generate electrical power when the reactant gas is supplied to the fuel cell. The fuel cell system further includes power consuming means operable to consume electrical power generated by the fuel cell, the power consuming means including reactant gas supply means configured to supply the reactant gas to the fuel cell and heating means configured to heat coolant supplied to the fuel cell, and control means for controlling operation of the fuel cell system. During a warm-up operation, the reactant gas supply means starts a flow of the reactant gas such that the reactant gas supply means consumes power, and the reactant gas supply means increases the flow of the reactant gas over time such that the power consumed by the reactant gas supply means increases over time. Additionally, after the flow of the reactant gas is started, the heating means starts heating the coolant supplied to the fuel cell such that the heating means consumes power.

Thus, in the various embodiments of the present invention, as disclosed in detail below, the operation of the fuel cell is prevented from becoming unstable or the fuel cell is enabled to recover from an unstable power generation condition. As a result, the generating power of the fuel cell can be readily increased during a warm-up operation and the temperature of the fuel cell can be increased to promote the warming-up of the fuel cell.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
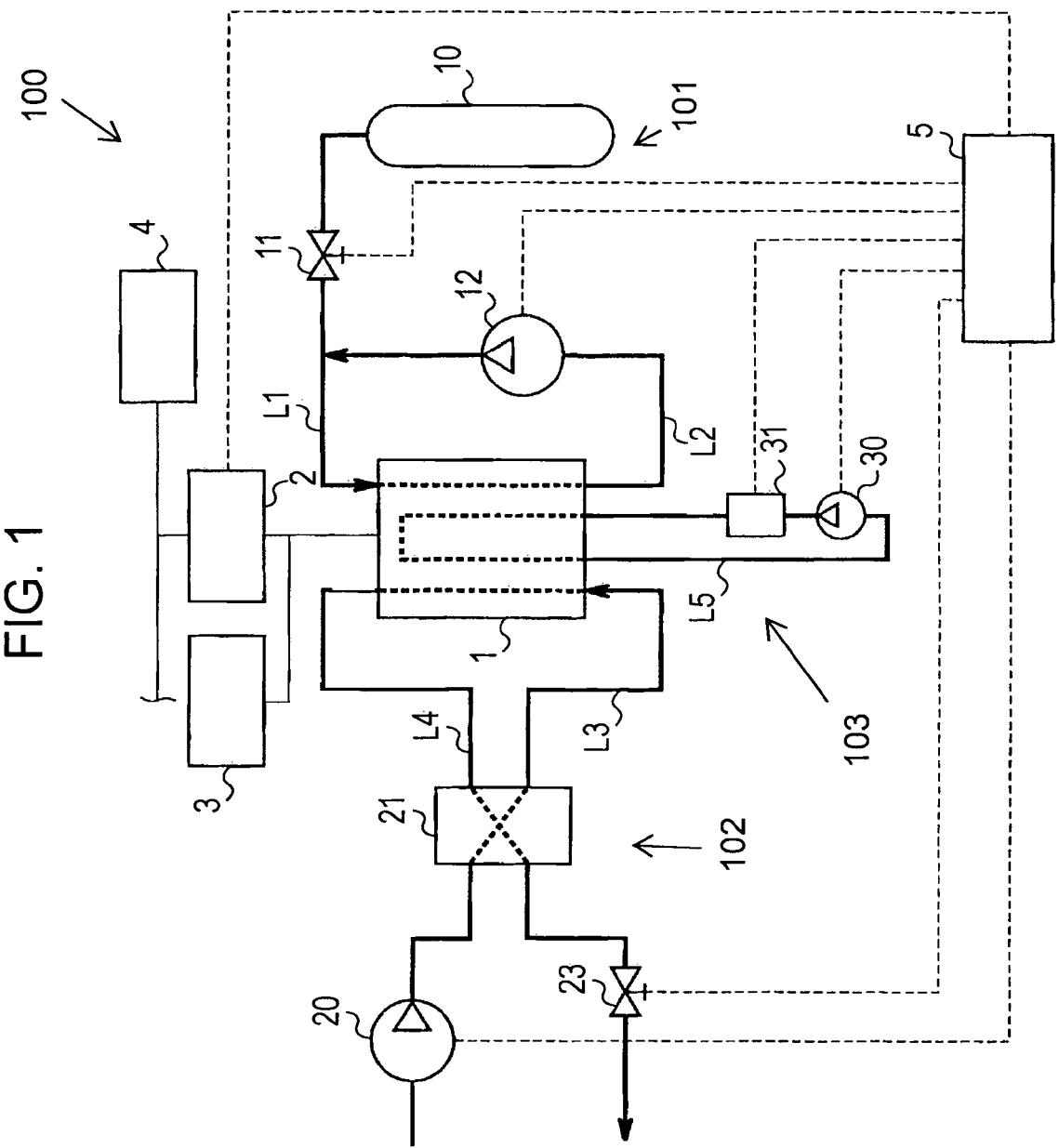
FIG. 1 is a block diagram showing a general configuration of a fuel cell system according to a first embodiment of the invention.

Embodiments of the present invention will be described in detail below with reference to the accompanying drawings.
First Embodiment FIG. 1 is a block diagram showing a general configuration of a fuel cell system 100 according to a first embodiment of the present invention. For example, the fuel cell system 100 is mounted on a vehicle which is a movable body. The vehicle is driven by power supplied from the fuel cell system 100.

The fuel cell system 100 includes a fuel cell stack 1 having a one or more stacked fuel cell structures and separators interposed between the fuel cell structures to hold the fuel cell structures. As used herein the term fuel cell stack encompasses a fuel cell stack including one or more individual fuel cells. The structure of each fuel cell includes a fuel electrode, an oxidizer electrode, and a polymer electrolyte membrane interposed between the fuel electrode and the oxidizer electrode. In the fuel cell stack 1, fuel gas is supplied to each fuel electrode, and oxidizing gas is supplied to each oxidizer electrode. Collectively, the fuel gas and the oxidizing gas are termed "reactant gas." The reactant gas is electrochemically reacted to produce power (i.e., the fuel gas and the oxidizing gas are electrochemically reacted with each other to produce power). In the embodiment described herein, the fuel gas is hydrogen and the oxidizing gas is air. However, it is understood that the fuel gas can a gas comprising hydrogen and the oxidizing gas can be a gas comprising oxygen.

The fuel cell system 100 includes a hydrogen system 101 which supplies hydrogen to the fuel cell stack 1, an air system 102 which supplies air to the fuel cell stack 1, and a cooling system 103 which cools the fuel cell stack 1. Electrical power generated by the fuel cell stack 1 is referred to herein as the generating power of the fuel cell stack 1.

In the hydrogen system 101, the hydrogen serving as the fuel gas is stored in a fuel tank 10 such as a high-pressure hydrogen cylinder, and the hydrogen is supplied to the fuel cell stack 1 from the fuel tank 10 through a hydrogen supply path L1. In particular, a fuel tank main valve (not shown) is provided downstream of the fuel tank 10. When the fuel tank main valve is open, the pressure of the high-pressure hydrogen gas from the fuel tank 10 is mechanically reduced to a predetermined pressure by a reducing valve (not shown) provided downstream of the fuel tank main valve. The pressure of the pressure-reduced hydrogen gas is regulated to be a desired pressure by a hydrogen pressure regulating valve 11 provided downstream of the reducing valve, and then is supplied to the fuel cell stack 1.

Exhaust gas (containing unused hydrogen gas), which is discharged from the individual fuel electrodes in the fuel cell stack 1, is discharged from the fuel cell stack 1 to a hydrogen recirculation path L2. A second end of the hydrogen recirculation path L2 is connected to the hydrogen supply path L1 located downstream of the hydrogen pressure regulating valve 11. The hydrogen recirculation path L2 has a circulation device, which is, for example, a hydrogen circulation pump 12. When the hydrogen circulation pump 12 is operating, exhaust gas discharged from the fuel cell stack 1 through the hydrogen recirculation path L2 is combined with the hydrogen which is supplied from the fuel tank 10. Hence, the exhaust gas is recirculated to the fuel electrodes of the fuel cell stack 1.

In the air system 102, for example, outside (ambient) air is acquired and compressed by a compressor 20, and the compressed air is supplied to the fuel cell stack 1 through an air supply path L3. In the air supply path L3, a humidifier 21 is provided downstream of the compressor 20. The humidifier 21 humidifies the air supplied to the fuel cell stack 1 so that the air has a certain humidity level necessary for the electrochemical reaction in the fuel cell stack 1.

Exhaust gas discharged from the individual oxidizer electrodes in the fuel cell stack 1 (the air with at least some of its oxygen consumed) is discharged to the outside through an air discharge path L4. The exhaust gas has a high humidity due to water created by the electrochemical reaction in the fuel cell stack 1 to produce power. The humidifier 21 is connected to the air discharge path L4. The humidifier 21 reduces the moisture content of the exhaust gas. That is, the humidifier 21 humidifies the air supplied to the fuel cell stack 1 by exchanging moisture between the air supplied to the fuel cell stack 1 and the exhaust gas exiting the fuel cell stack 1. The air discharge path L4 has an air backpressure regulating valve 23 which regulates the backpressure of the air in the fuel cell stack 1 and thus the pressure of the air supplied to the fuel cell stack 1.

The cooling system 102 has a closed-loop stack-cooling path L5 through which coolant (e.g., cooling water) for cooling the fuel cell stack 1 is circulated. The stack-cooling path L5 has a cooling water circulation pump 30 which causes the cooling water to be circulated. By operating the cooling water circulation pump 30, the cooling water in the stack-cooling path L5 is circulated. A cooling device such as a radiator (not shown) is provided in the stack-cooling path L5 downstream of the fuel cell stack 1 for dissipating heat generated by the fuel cell stack 1. The cooling water, the temperature of which has risen as a result of providing cooling to the fuel cell stack 1, flows through the stack-cooling path L5 to the cooling device, and is cooled by the cooling device. The cooled cooling water is the supplied to the fuel cell stack 1 again in a loop. The stack-cooling path L5 is split into small paths in the fuel cell stack 1, so that the inside of the fuel cell stack 1 can be entirely cooled. In the stack-cooling path L5, a heating device 31 (e.g., a heater) is provided between the cooling water circulation pump 30 and the fuel cell stack 1 in the stack-cooling path L5. The heater 31 is configured to selectively provide heat to the cooling water.

A power extraction device 2 is connected to the fuel cell stack 1. The power extraction device 2 controls power to be extracted from the fuel cell stack 1 based on the electrical current produced by the fuel cell stack 1. The power from the fuel cell stack 1 is supplied directly to a driving motor 3 that drives the vehicle, indirectly via the power extraction device 2 to a power storage device 4 (e.g., a battery) and various auxiliary devices. Some of the auxiliary devices are necessary for power generation by the fuel cell stack 1, and include the compressor 20, the heater 31, the cooling water circulation pump 30, and the hydrogen circulation pump 12. Other of the auxiliary devices serve other purposes in the vehicle, such as for air conditioning or electric power steering or other electronic systems. When the generating power of the fuel cell stack 1 is deficient compared with the required power to operate the fuel cell system 100, the battery 4 supplies power in the amount of the deficiency to the driving motor 3 and the auxiliary devices. Also, when the generating power of the fuel cell stack 1 exceeds the required power, the battery 4 stores the excess power produced by the fuel cell stack 1. Additionally, the battery 4 can be used to store regenerated power produced by the driving motor 3 during regenerative braking or deceleration of the vehicle.

A controller 5 integrally controls operation of the system 100. The controller 5 is operated under a control program so as to control the operation condition of the system 100. The controller 5 may be a microcomputer comprising a CPU, a ROM, a RAM, and an I/O interface. The controller 5 carries out various calculations on the basis of the operating condition of the system, and outputs the results of the calculations as control signals to various actuators (not shown), so as to control various elements, including but not limited to the hydrogen pressure regulating valve 11, the hydrogen circulation pump 12, the compressor 20, the air pressure regulating valve 23, the cooling water circulation pump 30, the heater 31, and the power extraction device 2.

The controller 5 receives sensor signals from various sensors to detect the condition of the system. The sensors may include a voltmeter that detects the voltage of individual cells of the fuel cell stack 1, a current sensor that detects the current extracted from the fuel cell stack 1, and a pressure sensor that detects the pressure of a reactant gas to be supplied to the fuel electrode or to the oxidizer electrode. The controller 5 can also monitor the state of charge of the battery 4.

According to this embodiment, the controller 5 sets a target generating power of the fuel cell stack 1, increases the target generating power of the fuel cell stack 1, and activates power consuming equipment in a warm-up operation of the system 100. The warm-up operation may be required when first startup up the fuel cell system 100 or when restarting the fuel cell system 100 after having been shut down for a period of time sufficient for the fuel cell stack 1 to have cooled to a temperature at which the electrochemical reaction can occur only inefficiently. Therefore, the warm-up operation is more frequently required when starting or restarting the fuel cell system 100 in a cool-temperature condition when the ambient or outside temperature is low. Once the fuel cell system 100 has reached a normal operation, in which the fuel cell stack 1 is sufficiently warm that the electrochemical reaction occurs efficiently, the warm-up operation is not needed.

Additionally, when starting or restarting the fuel cell stack 1 in a cool-temperature environment, the voltage of the fuel cell stack 1 is diminished from the voltage generated by the fuel cell stack 1 under normal operation. As a result, the power generation of the fuel cell may become unstable. Because it is difficult for a fuel cell stack 1 to recover normal operation after becoming unstable, without being shut down and restarted, it is desirable to avoid an unstable operating condition. Also, an unstable operating condition will inhibit warming up of the fuel cell stack 1 and thus cause a longer time to elapse before normal operation can be achieved. A method in the prior art to avoid an unstable operating condition is to decrease the flow rate of the reactant gas supplied to the fuel cell as compared with the flow rate for normal operation, but doing so alone may promote unstable operation. Therefore, the embodiments of the present invention employ additional methods to avoid unstable operation.

The controller 5 seeks to balance the generating power of the fuel cell stack 1 with the electrical load on the fuel cell stack 1. Accordingly, the target generating power and the load of the power consuming equipment are adjusted in tandem to be approximately matched. The power consuming equipment includes a plurality of electrical load devices that operate by consuming power. In this embodiment, the load devices include the compressor 20 that supplies the air to the oxidizer electrode of the fuel cell stack 1 and the heater 31 that heats the coolant supplied to the fuel cell stack 1.

In this embodiment, the controller 5 initially performs a first power consumption control in which a flow rate of the reactant gas is increased by a reactant gas supply apparatus which includes the compressor 20, thereby increasing power to be consumed by the compressor 20. Note that the reactant gas supply apparatus may include additional power consuming devices related to the supply of either or both the fuel gas and the oxidizing gas. Then, after the first power consumption control is started, the controller 5 next performs a second power consumption control in which a heating device which includes the heater 31 heats the cooling water (i.e., increases the temperature of the cooling water), thereby increasing power to be consumed by the heater 31.

Figure 2:
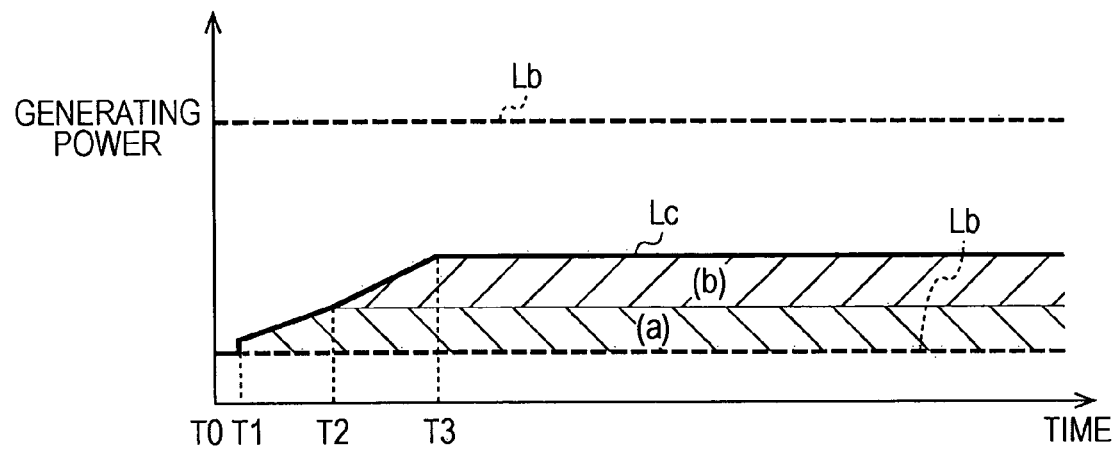
FIG. 2 is a conceptual diagram showing a control method of the fuel cell system according to the first embodiment.
Figure 8:
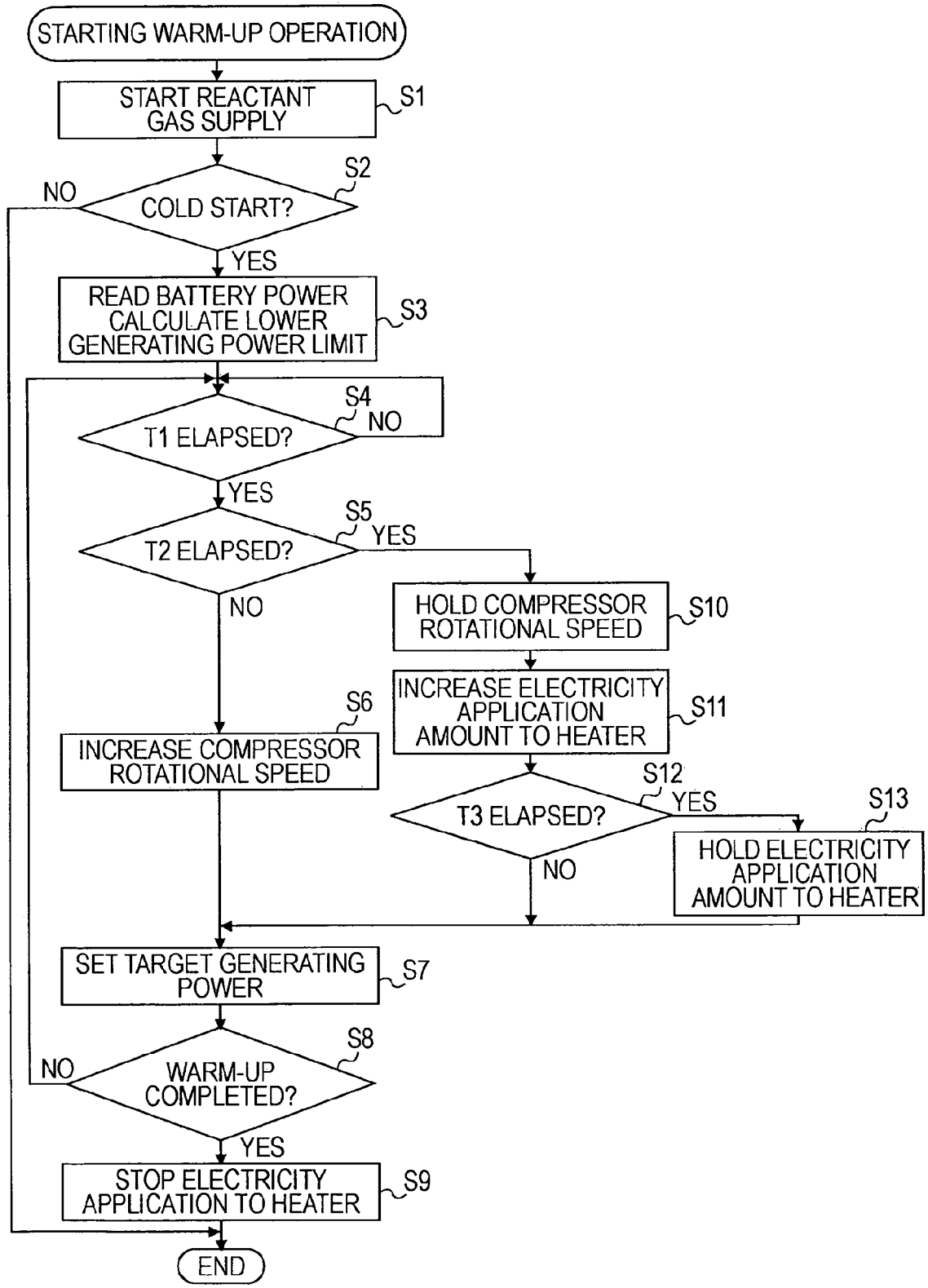
FIG. 8 is a control flowchart according to the first embodiment.

FIG. 2 is a conceptual diagram showing a control method of the fuel cell system 100 in this embodiment. FIG. 8 is a control flowchart of this embodiment. The control method in this embodiment is applied to the warm-up operation executed upon starting of the fuel cell system 100 in a cool-temperature environment. In FIG. 2, reference character La denotes a lower generating power limit, and Lb denotes an upper generating power limit. The lower generating power limit Lb is a parameter that defines a lower limit of the generating power of the fuel cell stack 1, which corresponds to the minimum power necessary for operating the auxiliary devices necessary for the fuel cell stack 1 to generate power. During normal operation of the fuel cell, the reactant gas, including hydrogen and air, is supplied at a normal operation pressure. During the warm-up operation in this embodiment, the reactant gas is supplied at a warm-up pressure that is lower than the normal operation pressure. By supplying the reactant gas at a lower warm-up pressure, moisture can be more efficiently removed from the vicinity of the electrolyte membrane of the fuel cell stack 1. This is important because the presence of moisture in the vicinity of the electrolyte membrane can inhibit the diffusion or transport of reactant gas to the membrane, which can thus impeded the ability of the fuel cell stack 1 to generate power.

The operation of this embodiment will be described with reference to FIGS. 2 and 8. In step S1, the operation of the fuel cell stack 1 is started at time T0, and the controller proceeds to step S2. In step S2, the controller 5 determines whether or not the present starting is cold start requiring a warm-up operation. If a warm-up operation is required (YES in step S2), the controller 5 proceeds to step S3 and calculates a lower generating power limit La by taking account of the state of charge of battery 4. The lower generating power limit La is set as a target generating power Lc, and power generation by the fuel cell stack 1 is performed based on the target generating power Lc. The controller 5 supplies power to auxiliary devices until time T1 has elapsed, as determined in step S4. For example, the time T1 can be about 1 to 5 seconds. Until time T1 has elapsed, the auxiliary devices consume power corresponding to the target generating power Lc at the time, which is the lower generating power limit La.

Then, at time T1, and until a time T2 has elapsed, the controller 5 proceeds to step S6 and performs the first power consumption control in which the flow rate of the air is increased relative to the current flow rate of the air, which is the air flow supplied to the oxidizing electrode of the fuel cell stack 1 in accordance with the lower generating power limit La. The flow rate of the air can be increased by increasing the rotational speed of the compressor 20. Then, in step S7, taking account of power to be consumed by the compressor 20 as a result of the increase in the rotational speed, the controller 5 calculates a target generating power Lc over time by adding the consuming power of the compressor 20 to the lower generating power limit La. That is, the target generating power Lc tends to be increased relative to the lower generating power limit La because of the power consumed by the compressor 20. The controller 5 cause the power generation to be performed by the fuel cell stack 1 on the basis of the target generating power Lc, and increases the rotational speed of the compressor 20 relative to the current rotational speed, so that power generated in excess of the lower generating power limit La is consumed by the compressor 20 in increasing the air flow rate. It is to be noted that when the target generating power Lc is increased, and the flow rate of air is increased by increasing the rotational speed of the compressor 20, the flow rate of the hydrogen supplied to the fuel electrode of the fuel cell stack 1 is increased similarly to the flow rate of the air in order to maintain the increased power generation of the fuel cell stack 1.

At time T2 after a predetermined time elapses from time T1, as determined by step S5, the controller 5 proceeds to step S10 and holds the rotational speed of the compressor 20 constant. For example, the time T2 can occur about 20 to 30 seconds elapse after the time T0. The controller 5 then proceeds to step S11 and performs the second power consumption control in which the cooling water is heated (i.e., the temperature of the cooling water is increased). The temperature of the cooling water can be increased by applying an amount of electrical power to the heater 31 and increasing the amount of power supplied to the heater 31 until the desired heating is achieved. Before a time T3 has elapsed, the controller returns to step S7 and recalculates the target generating power Lc over time. Taking account of the power consumed by the heater 31, the controller 5 calculates t target generating power Lc by adding the power consumed by the heater 31 to the sum of the power consumed by the compressor 20 as a result of the increase in the air flow rate and the lower generating power limit La. That is, the target generating power Lc tends to be increased relative to the lower generating power limit La because of the power consumed by the heater 31. The controller 5 cause the power generation to be performed by the fuel cell stack 1 on the basis of the target generating power Lc, which increases over time as more power is applied to the compressor 20 and then to the heater 31. Accordingly, power generated over the lower generating power limit La, and over the power consumed by the compressor 20 as a result of the increase in the flow rate (designated as region (a) in FIG. 2), is consumed by the operation of the heater 31 (designated as region (b) in FIG. 2).

At time T3, as determined by step S2, the controller 5 proceeds to step S13 and holds the amount of power supplied to the heater 31 constant. For example, the time T3 can occur about 5 to 10 minutes after the time T0. Accordingly, the target generating power Lc of the fuel cell stack 1 becomes the total sum of the lower generating power limit La, the power consumed by the compressor 20 as a result of the increase in the air flow rate (region (a) in FIG. 2), and the power consumed by the heater 31 (region (b) in FIG. 2). Power generated by the fuel cell stack 1 in excess of the lower generating power limit La, that is, the power corresponding to the regions (a) and (b), is consumed by the compressor 20 and the heater 31, respectively.

When the voltage to be generated by the fuel cell reaches a generating voltage for the normal operation, or when the temperature of the fuel cell reaches a warm-up completion temperature, it is determined in step S8 that the warm-up operation is completed. If it is determined in step S8 that the warm-up operation is not completed, the controller 5 returns to steps S4, S5, and S12, and the subsequent process steps after each time T1, T2, and T3 has elapsed. Once the warm-up operation is completed, the controller 5 proceeds to step S9 and stops power to the heater 31 so that the cooling water is no longer being heated. Then, the warm-up operation is ended.

In this embodiment, the controller 5 of the fuel cell system 100 performs power consumption control in which the generating power of the fuel cell stack 1 is consumed in accordance with the target generating power Lc, by increasing the target generating power Lc of the fuel cell stack 1 and operating the power consumption equipment. Herein, the power consumption equipment includes the compressor 20 and the heater 31. For power consumption control, the controller 5 initially performs the first power consumption control in which the flow rate of the reactant gas is increased by the reactant gas supply device including the compressor 20, and then, after the first power consumption control is started, the controller 5 next performs the second power consumption control in which the temperature of the cooling water is increased by the heater 31.

With this configuration, the target generating power Lc is increased relative to the lower generating power limit La, and the increased power is consumed by the auxiliary devices. Accordingly, since the temperature of the fuel cell stack 1 is increased, the warming-up of the fuel cell stack 1 can be promoted.

In addition, with this embodiment, by initially performing the first power consumption control, the flow rate of the air is increased relative to the flow rate of the air corresponding to the lower generating power limit La. When starting power generation in a cool-temperature environment, water produced due to the power generation reaction may accumulate near the electrolyte membrane. And water produced by the power generation reaction may inhibit the diffusion of the reactant gas to the membrane, allowing only a part of a reaction surface of the electrolyte membrane to be available to contribute to the power generation. However, the problem of water accumulation near the electrolyte membrane is overcome with this embodiment by increasing the flow rate of the air and thereby removing the moisture that would otherwise inhibit the power generating reaction from occurring in the fuel cell stack 1. As a result, the reactant gas can react at the electrolyte membrane easily. Further, the fuel cell stack 1 can be prevented from entering an unstable power generation condition wherein the voltage of the cell is decreased because of water inhibiting the diffusion of the reactant gas at the electrolyte membrane. Also, by increasing the generating power of the fuel cell stack 1 relative to the lower generating power limit La in accordance with the increase in the flow rate of the air, the temperature of the fuel cell can be increased. Accordingly, the warming up of the fuel cell stack 1 can be promoted.

The second power consumption control is performed after the first power consumption control. The power generation by the fuel cell stack 1 becomes stable through the first power consumption control, and then the application of electric power to the heater 31 is performed in the second power consumption control. Accordingly, the electric power from the fuel cell stack 1 can be stably provided to the heater 31, and the cooling water is heated by the power supplied to the heater 31. The heating of the cooling water by the heater 31 further promotes the increase in temperature of the fuel cell stack 1 to accelerate warming up of the fuel cell stack 1. Since the generating power of the fuel cell stack 1 is increased in accordance with the power consumed b the heater 31, the temperature of the fuel cell stack 1 is additionally increased. Accordingly, the warming-up of the fuel cell stack 1 can be promoted.

The heater 31 for heating the cooling water is generally located at a position separated from the fuel cell stack 1. Thus, when the cooling water temperature is low and the circulation rate of the cooling water is extremely low, a certain period of time is necessary until the cooling water heated by the heater 31 reaches the fuel cell stack 1 and contributes to the warming up of the fuel cell stack 1. Thus, in the warm-up operation, by initially performing the first power consumption control during which only the load of the compressor 20 must be generated by the fuel cell stack 1, an then only when stable operation of the fuel cell has been achieved performing the second power consumption control during which the load of the heater 31 must also be generated by the fuel cell stack 1, a stable power generation condition can be obtained at earlier timing, thereby promoting the warming-up of the fuel cell stack 1 at an earlier time.

It is to be noted that time T2 at which the power is applied to the heater 31 may be determined to be a time at which the fuel cell stack 1 can perform stable power generation, for example, a timing at which variations in voltages of individual cells of the fuel cell stack 1 remain within a predetermined range.

Second Embodiment

Figure 3:
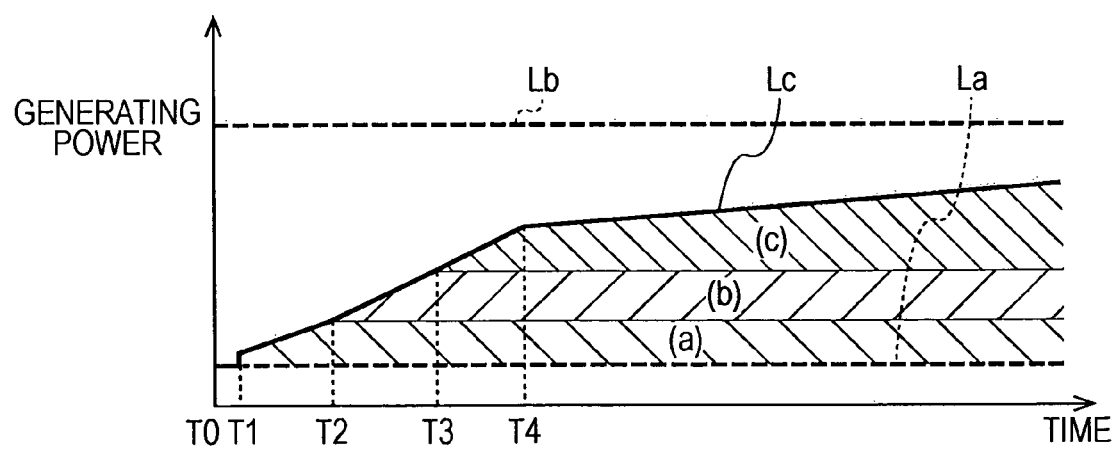
FIG. 3 is a conceptual diagram showing a control method of a fuel cell system according to a second embodiment of the invention.
Figure 9:
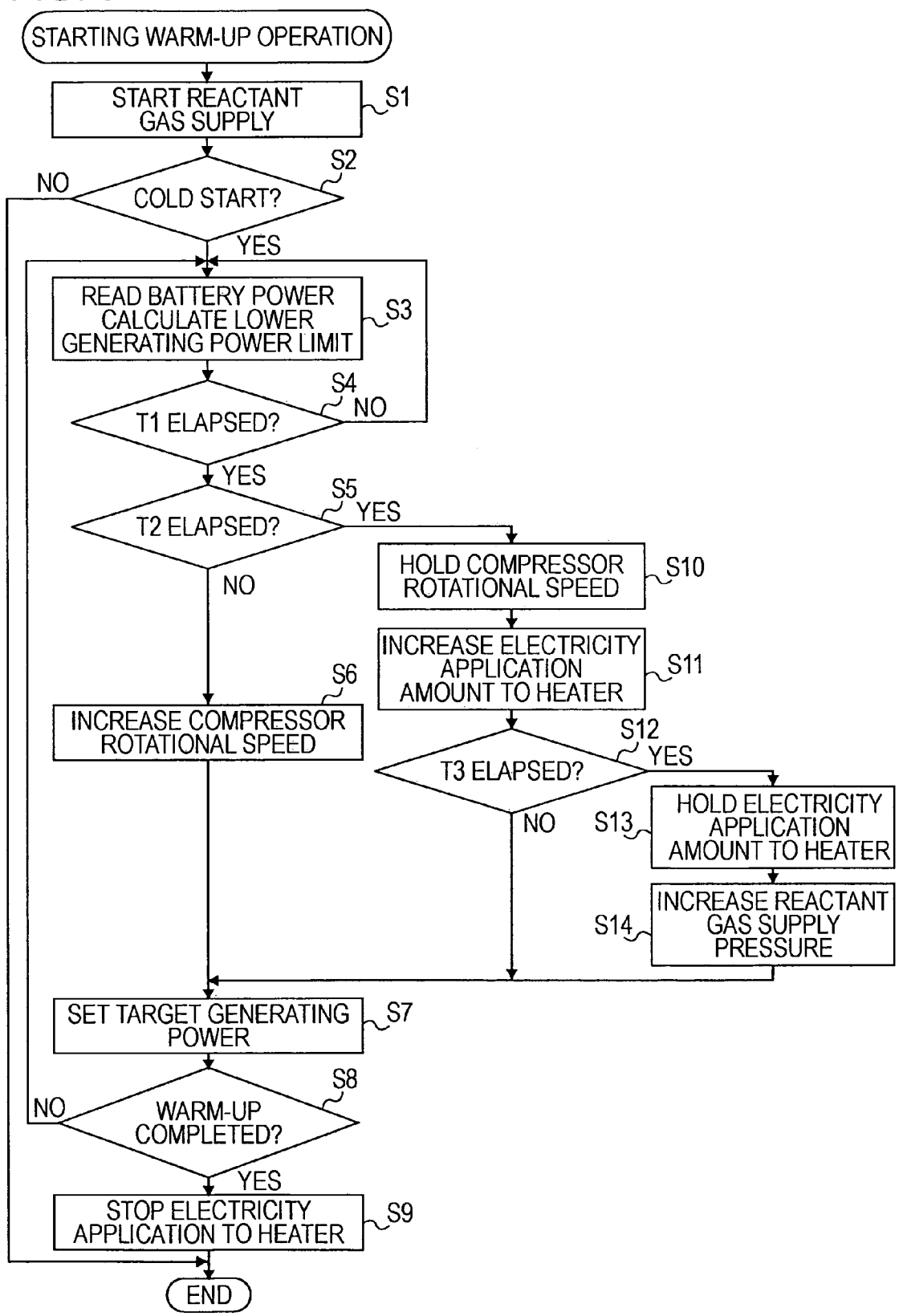
FIG. 9 is a control flowchart according to the second embodiment.

A fuel cell system according a second embodiment of the present invention is described below. FIG. 3 is a conceptual diagram showing a control method of the fuel cell system according to this embodiment. FIG. 9 is a control flowchart of this embodiment, which is different from FIG. 8 in that step S14 is added.

At time T3, as in the first embodiment, the controller 5 holds the amount of power supplied to the heater 31 constant in step S13. Then, in step S14, the controller 5 performs a third power consumption control in which the supply pressure of the air to the fuel cell stack 1 is increased relative to the warm-up pressure. The pressure of the air can be increased by increasing the rotational speed of the compressor 20 and/or by decreasing the opening of the air backpressure regulating valve 23. At this time, taking account of the power to be consumed by the compressor 20 in accordance with the increase in the rotational speed needed to increase the air pressure over time, the controller 5 calculates a target generating power Lc over time by adding the power consumed by the compressor 20 to the sum of the power consumed by the compressor 20 as a result of the increase in the flow rate, the power consumed by the heater 31 in heating the coolant, and the lower generating power limit La. That is, the target generating power Lc tends to be increased over time relative to the lower generating power limit La.

Then, the controller 5 cause the power generation to be performed by the fuel cell stack 1 on the basis of the target generating power Lc, and also increases the rotational speed of the compressor 20 relative to the current rotational speed, so that power generated in excess of the combination of the lower generating power limit La, the power consumed by the compressor 20 (region (a) in FIG. 3) as a result of the increase in the flow rate, and the power consumed by the heater 31 in heating the coolant (region (b) in FIG. 3), is consumed by the pressure increasing operation of the compressor 20 (region (c) in FIG. 3). It is to be noted that the pressure of the hydrogen to be supplied to the fuel electrode of the fuel cell stack 1 is increased similarly to the pressure of the air, so that the pressure of the hydrogen and the pressure of the air maintain a permissible differential pressure range between the fuel electrode and the oxidizer electrode (i.e., across the electrolyte membrane). In this case, the hydrogen pressure may be increased more rapidly than the air pressure, until time T4 when the pressure of the air reaches the permissible differential pressure.

Accordingly, the target generating power Lc of the fuel cell stack 1 becomes the total sum of the lower generating power limit La, the power consumed by the compressor 20 (region (a) in FIG. 3) as a result of the increase in the flow rate, the consuming power of the heater 31 in heating the coolant (region (b) in FIG. 3), and the consuming power of the compressor 20 as a result of the increase in the pressure (region (c) in FIG. 3). Thus, power generated in excess of the lower generating power limit La, that is, the power corresponding to the regions (a), (b), and (c), is consumed by the compressor 20 and the heater 31.

As described above, in this embodiment, after the second power consumption control is started, the controller 5 performs the third power consumption control in which the pressure of the reactant gas is increased by the compressor 20.

As described in the first embodiment, in a situation in which the moisture that inhibits the electrochemical reaction from occurring in the electrolyte membrane is efficiently removed, it is preferable that the flow rate of the air is increased and the pressure of the air is decreased as compared with the pressure in the normal operation.

In this embodiment, the flow rate of the air is increased by the compressor 20 and the power is applied to the heater 31, thereby removing the moisture and increasing the temperature of the cell. And, after a sufficient time has elapsed such that an unstable power generation condition is avoided (for example, a time has elapsed such that the each average of detected voltage of the individual fuel cells is almost same), or a sufficient time has elapsed after which an unstable power generation would be expected to be stabilized, the pressure of the air (and the fuel) supplied to the fuel cell is increased. Thus, the removal of the water from the electrolyte membrane is carried out efficiently. Further, because the increase of the pressure of the reactant gas was delayed until a sufficient time had elapsed such that the unstable power generation condition is avoided, the water produced through power generation is prevented from increasing rapidly until the pressure of the reactant gas increases. Still further, by increasing the pressure of the air and the fuel, the generating power of the fuel cell stack 1 can be further increased. Accordingly, the temperature of the fuel cell stack 1 is increased, and the warming-up of the fuel cell stack 1 can be promoted so that the fuel cell stack 1 can reach normal operation at an earlier time.

Third Embodiment

Figure 4:
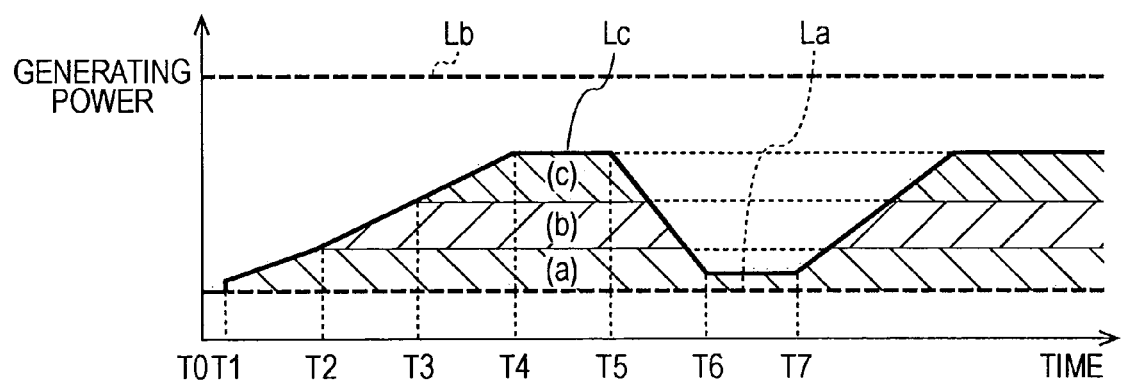
FIG. 4 is a conceptual diagram showing a control method of a fuel cell system according to a third embodiment of the invention.
Figure 10:
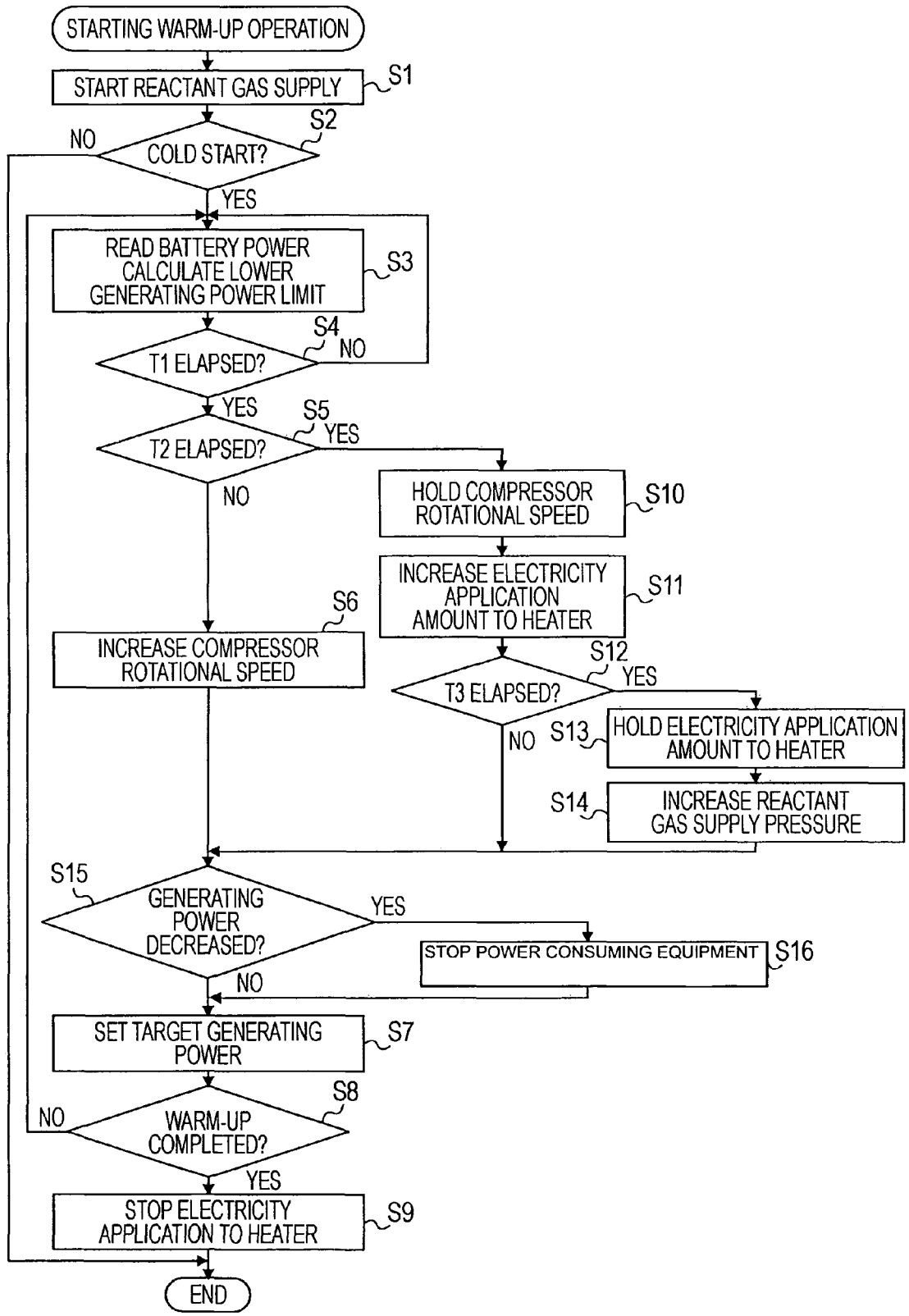
FIG. 10 is a control flowchart according to the third embodiment.

A fuel cell system according a third embodiment of the present invention is described below. FIG. 4 is a conceptual diagram showing a control method of the fuel cell system according to this embodiment. FIG. 10 is a control flowchart of this embodiment.

The third embodiment is different from the second embodiment in that, when it is determined at time T5 that the generating power of the fuel cell stack 1 is decreasing, the controller 5 decreases the target generating power Lc correspondingly. The generating power of the fuel cell stack 1 may be decreasing because, for example, too much water is accumulating in the vicinity of the electrolyte membrane or operation of the fuel cell stack 1 has become, or is starting to become, unstable. Thus, in step S15, when it is determined that the generating power of the fuel cell stack 1 is decreasing, the controller 5 proceeds to step S16 and the power consuming equipment is stopped. Also, the controller 5 decreases a power consumption amount of the auxiliary devices. In particular, the controller 5 performs a fourth power consumption control in a pattern opposite to the operation pattern of the first, second, and third power consumption controls performed when the target generating power Lc is increased. To be more specific, at time T5, the controller 5 first stops the power consuming equipment by reversing the third power consumption control, which was performed last. Thus, in an initial portion of the fourth power consumption control, the supply pressure of the air and the fuel (i.e., the reactant gas) to the fuel cell stack 1 is decreased to the warm-up pressure. By reducing the speed of the compressor 20 and/or opening the air backpressure regulating valve, the power consumed by the compressor 20 is decreased. Next, if the generating power of the fuel cell stack 1 is still decreasing, the controller 5 further decreases the target generating power Lc and decreases the amount of power consumed by the heater 31 correspondingly, until the power application to the heater 31 ceases. Further, if the generating power of the fuel cell stack 1 is still decreasing, the controller 5 further decreases the target generating power Lc, and also decreases the flow rate of the air accordingly by decreasing further the speed of the compressor 20 and thus decreasing the power consumed by the compressor 20.

At time T6, in step S15, when it is determined that the generating power of the fuel cell stack 1 is not decreasing or is no longer decreasing, the controller 5 proceeds to step S7 and holds the target generating power Lc as the value in the current condition. Then, at time T7, after a predetermined time has elapsed, the controller 5 increases the target generating power Lc, and successively performs the first power consumption control, the second power consumption control, and the third power consumption control as described above. The time elapsed between time T6 and time T7 can be about 5 seconds to about 10 seconds.

In this embodiment, when the controller 5 determines that the increased target generating power Lc should be decreased because the generating power of the fuel cell stack 1 is decreasing, the controller 5 performs the power consumption control in the reverse order from the order in which the power consumption control for increasing the target generating power Lc was performed.

If the order of increasing and decreasing of the power consumption control were not followed, as prescribed in this embodiment, unstable power generation of the fuel cell stack 1 could result. For example, at time T2, even if it is possible to increase the generating power of the fuel cell stack 1, the flow rate of the air may not be increased yet to a value that the moisture is sufficiently removable. Thus, if the cooling water is heated and the pressure of the air is increased, the generating power of the fuel cell stack 1 may be decreased as described above. Also, in a situation where the consuming power of the auxiliary devices is decreased in accordance with the decrease in the target generating power Lc, if the control for decreasing the flow rate of the air and the control for decreasing the pressure of the air are performed simultaneously, or if the control for decreasing the flow rate of the air is performed before the control for decreasing the pressure of the air, the pressure of the air may become too high, or the flow rate of the air may become insufficient, thereby being disadvantageous to removing the moisture. In such situations, the fuel cell stack 1 operation could become unstable and it would be difficult to recover operation back to a stable power generation condition. Accordingly, it is preferable to avoid such a condition by following the sequence in this embodiment.

Therefore, in this embodiment, the decreasing power consumption control operations are performed in a reversed pattern to the pattern for the increasing operation of the target generating power Lc. Accordingly, such disadvantages can be prevented.

Fourth Embodiment

Figure 5:
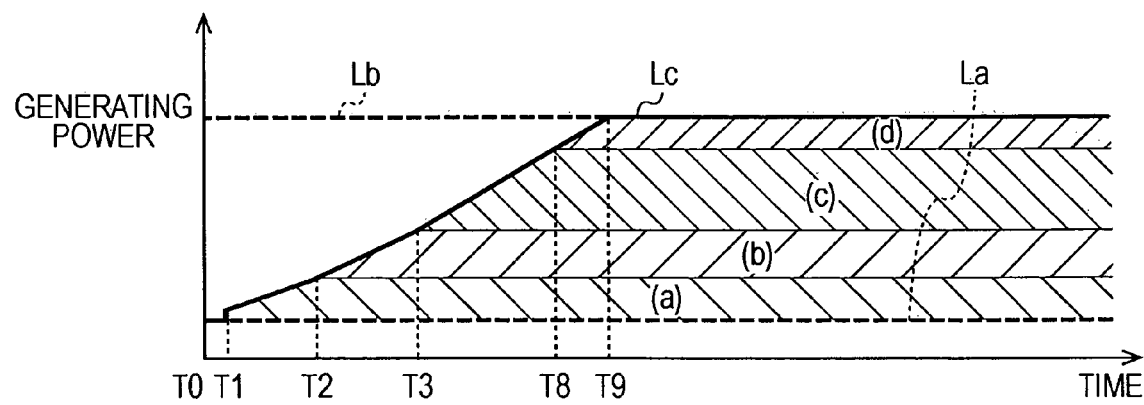
FIG. 5 is a conceptual diagram showing a control method of a fuel cell system according to a fourth embodiment of the invention.

A fuel cell system according a fourth embodiment of the present invention is described below. FIG. 5 is a conceptual diagram showing a control method of the fuel cell system according to this embodiment. The fourth embodiment provides a control method that is basically similar to that of the second embodiment. The fourth embodiment is different from the second embodiment in that at time T8 after time T3, a fifth power consumption control is performed in which the rotational speed of the compressor 20 is held constant, and the generating power of the fuel cell stack 1 is consumed by a substitute auxiliary device.

The substitute auxiliary device may be, for example, another heater (not shown) provided for preventing freezing in the fuel cell system, or an air conditioner for the vehicle. Taking account of power to be consumed by the substitute auxiliary device, the controller 5 calculates a target generating power Lc. That is, the target generating power Lc tends to be increased relative to the lower generating power limit La. The controller 5 shifts the power supply for the substitute auxiliary device from the battery 4 to the fuel cell stack 1, and power acquired in excess of the combination of the lower generating power limit La, the consuming power of the compressor 20 (regions (a) and (c) in FIG. 5), and the consuming power of the heater 31 (region (b) in FIG. 5), is consumed by the operation of the substitute auxiliary device.

At time T9, when the target generating power Lc reaches the upper generating power limit Lb, the controller 5 limits the target generating power Lc to the upper generating power limit Lb.

In this embodiment, by further increasing the generating power of the fuel cell stack 1, the temperature of the fuel cell can be further increased. Accordingly, the warming-up of the fuel cell stack 1 can be further promoted.

Fifth Embodiment

Figure 6:
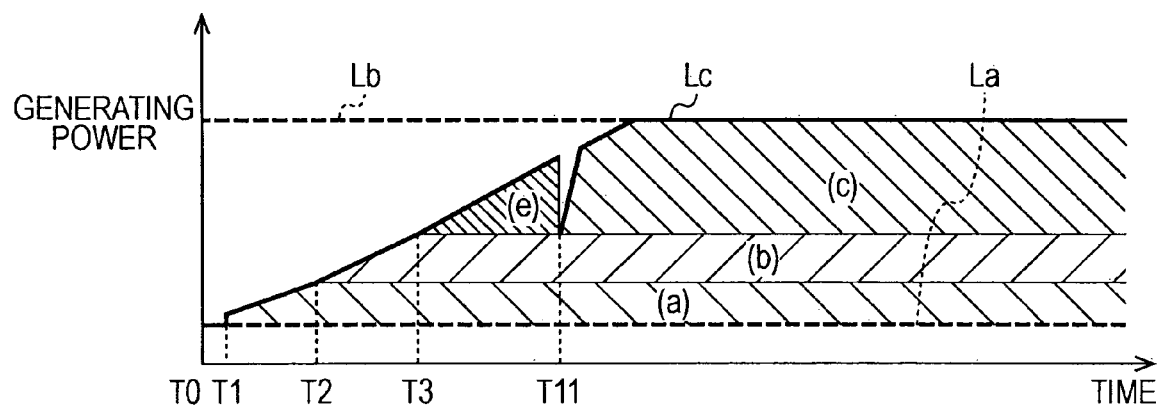
FIG. 6 is a conceptual diagram showing a control method of a fuel cell system according to a fifth embodiment of the invention.

A fuel cell system according a fifth embodiment of the present invention is described below. FIG. 6 is a conceptual diagram showing a control method of the fuel cell system in this embodiment. The fifth embodiment is basically similar to the second embodiment. The fifth embodiment is different from the second embodiment in that, at time T3, the controller 5 holds the amount of power supplied to the heater 31 constant, then performs power consumption control in which the generating power of the fuel cell stack 1 is used to charge to the power storage device (battery) 4 in preparation for the third power consumption control, and then the charging amount is increased.

At this time, taking account of power to be consumed for the charging of the battery 4, the controller 5 calculates a target generating power Lc over time. Also, the controller 5 increases the charging amount of the battery 4, so that power generated in excess of the combination of the lower generating power limit La, the consuming power of the compressor 20 (region (a) in FIG. 6), and the consuming power of the heater 31 (region (b) in FIG. 6), is consumed by the charging to the battery 4 (region (e) in FIG. 6).

At time T11, when the charging of the battery 4 is completed, the controller 5 performs the third power consumption control. At this time, when the target generating power Lc reaches the upper generating power limit Lb, the controller 5 limits the target generating power Lc to the upper generating power limit Lb.

As described above, in this embodiment, after the second power consumption control is started, the controller 5 performs the charging of the battery 4, and then performs the third power consumption control.

The total power output at starting of the vehicle (i.e., the starting of the fuel cell system 100) is obtained such that the consuming power of the auxiliary devices is subtracted from the total sum of the maximum power to be discharged from the battery 4 and the maximum power to be generated by the fuel cell stack 1. The warm-up operation is defined to correspond to a period of time from the start or restart of the fuel cell system 100 until the total power output of the fuel cell stack 1 reaches a predetermined value or higher. Therefore, by charging the battery 4 during the warm-up operation, a higher output at starting of the fuel cell system 100 can be obtained even if the generating power of the fuel cell stack 1 itself is low, as compared with the case in which the battery 4 is not charged. Thus, by being able to use both the generating power of the fuel cell stack 1 and the stored power in the battery 4 to power the power consuming equipment such as the compressor 20 and the heater 31 during the warm-up operation, the warm-up time can be decreased.

Since the charging of the battery 4 is performed before the third power consumption control, the start timing of the increase in the pressure of the air (and the fuel) can be delayed. Hence, the power generation by the fuel cell stack 1 can become stable, and the output at starting of the fuel cell system 100 can be obtained at earlier time without the disadvantages of increasing the reactant gas flow too quickly.

Figure 7:
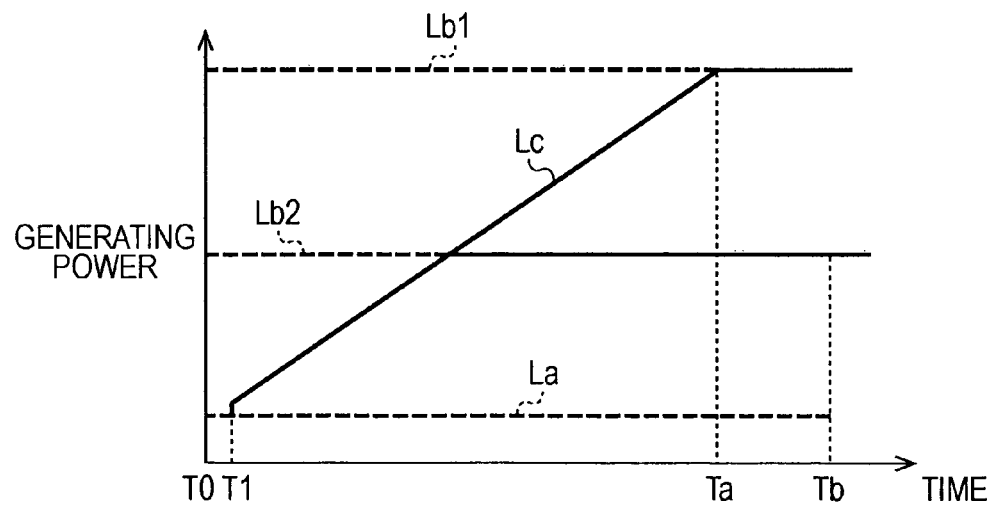
FIG. 7 is an explanatory diagram showing an upper generating power limit.

FIG. 7 is an explanatory diagram showing an upper generating power limit Lb. In the above-described embodiments, while the upper generating power limit Lb is described, it is preferable that the controller 5 sets the maximum consuming power of the power consuming equipment to the upper generating power limit Lb. As shown in FIG. 7, when an upper generating power limit Lb1 is applied to the maximum power to be absorbed by the power consuming equipment, the period of the warm-up operation is from timing T0 at which the power generation is started to timing Ta at which the warm-up operation is completed. When the upper generating power limit Lb2 is applied to a power lower than the maximum power, the period of the warm-up operation is from timing T0 at which the power generation is started to timing Tb at which the warm-up operation is completed. In this case, timing Ta comes earlier than timing Tb. Hence, by maximizing the upper generating power limit Lb to be equal to the maximum power absorbed by the power consuming equipment (i.e., Lb1), the warm-up operation can be shortened.

Also, in the fuel cell system 100 including the battery 4, the upper generating power limit Lb is set such that the power chargeable to the battery 4 is added to the maximum power to be consumed by the auxiliary load devices.

A fuel cell system and control method thereof have been described according to the embodiments. However, the present invention is not limited to the above-described embodiments, and may include various modifications within the scope of the present invention.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell system comprising:
   a fuel cell configured to cause reactant gas to be electrochemically reacted to generate electrical power when the reactant gas is supplied to the fuel cell;
   power consuming equipment operable to consume electrical power generated by the fuel cell, the power consuming equipment including a reactant gas supply apparatus configured to supply the reactant gas to the fuel cell and a heating device configured to heat coolant supplied to the fuel cell; and
   a controller for controlling operation of the fuel cell;
   wherein during a warm-up operation, the controller causes the reactant gas supply apparatus to start a flow of the reactant gas and to increase the flow of the reactant gas over time, such that the reactant gas supply apparatus starts to consume power and consumes increased power over time; and
   wherein after the reactant gas supply apparatus starts to consume a predetermined power increased by the increased flow of the reactant gas, the controller causes the heating device to start heating the coolant supplied to the fuel cell such that the heating device consumes power.

2. The fuel cell system according to claim 1, wherein the controller sets a target generating power of the fuel cell and increases the target generating power in accordance with the power consumed by the power consuming equipment.

3. The fuel cell system according to claim 2, wherein when the controller determines that the power generated by the fuel cell is unable to achieve the target generating power, the controller decreases the target generating power such that the controller causes the heater to stop heating the coolant and then causes the reactant gas supply apparatus to stop increasing the flow of the reactant gas over time.

4. The fuel cell system according to claim 1, wherein after the controller causes the heating device to start heating the coolant supplied to the fuel cell, the controller causes the reactant gas supply apparatus to increase the pressure of the reactant gas over time such that the power consumed by the reactant gas supply apparatus increases over time.

5. The fuel cell system according to claim 4,
   wherein the controller sets a target generating power of the fuel cell and increases the target generating power in accordance with power to be consumed by the power consuming equipment, and
   wherein when the controller determines that the power generated by the fuel cell is unable to achieve the target generating power, the controller causes the reactant gas supply apparatus to stop increasing the pressure of the reactant gas over time, and then the controller causes the reactant gas supply apparatus to stop increasing the flow of the reactant gas over time.

6. The fuel cell system according to claim 4,
   wherein the controller sets a target generating power of the fuel cell and increases the target generating power in accordance with power consumed by the power consuming equipment, and
   wherein when the controller determines that the power generated by the fuel cell is unable to achieve the target generating power, the controller decreases the target generating power such that the controller first causes the reactant gas supply apparatus to decrease the pressure of the reactant gas over time, then causes the heater to stop heating the coolant, and then causes the reactant gas supply apparatus to decrease the flow of the reactant gas over time.

7. The fuel cell system according to claim 4,
   wherein the power consuming equipment further includes a power storage device adapted to be charged by power generated by the fuel cell;
   wherein the controller starts charging the power storage device after the heating device starts heating the coolant; and
   wherein the controller then causes the reactant gas supply apparatus to increase the pressure of the reactant gas over time.

8. The fuel cell system according to claim 2,
   wherein the controller increases the target generating power of the fuel cell from a lower generating power limit to an upper generating power limit;
   wherein the lower generating power limit is set to a minimum value required for power generation by the fuel cell; and wherein the upper generating power limit is set to a maximum value for power generation performance of the fuel cell system.

9. The fuel cell system according to claim 2,
wherein the controller increases the target generating power of the fuel cell from a lower generating power limit to an upper generating power limit;
wherein the lower generating power limit is set to a minimum value required for power generation by the fuel cell; and
wherein the upper generating power limit is set to the sum of the lower target generating power limit and a maximum consuming power of the power consuming equipment.

10. A method for controlling a fuel cell system during a warm-up operation, the fuel cell system comprising a fuel cell configured to cause reactant gas to be electrochemically reacted to generate electrical power when the reactant gas is supplied to the fuel cell and power consuming equipment operable to consume electrical power generated by the fuel cell, the power consuming equipment including a reactant gas supply apparatus configured to supply the reactant gas to the fuel cell and a heating device configured to heat coolant supplied to the fuel cell, the method comprising:
starting a flow of the reactant gas such that the reactant gas supply apparatus consumes power;
increasing the flow of the reactant gas over time such that the power consumed by the reactant gas supply apparatus increases over time; and
after the reactant gas supply apparatus starts to consume a predetermined power increased by the increased flow of the reactant gas, heating the coolant supplied to the fuel cell such that the heating device consumes power.

11. The method according to claim 10, further comprising:
setting a target generating power of the fuel cell; and
increasing the target generating power in accordance with the power consumed by the power consuming equipment.

12. The method according to claim 11, further comprising:
determining whether or not the power generated by the fuel cell is able to achieve the target generating power;
when the power generated by the fuel cell is determined to be unable to achieve the target generating power, decreasing the target generating power; and
when the target generating power is decreased, stopping heating the coolant and then stopping increasing the flow of reactant gas over time.

13. The method according to claim 10, further comprising:
after starting heating of the coolant supplied to the fuel cell, increasing the pressure of the reactant gas over time thereby increasing the power consumed by the reactant gas supply apparatus over time.

14. The method according to claim 13, further comprising:
setting a target generating power of the fuel cell;
increasing the target generating power in accordance with power consumed by the power consuming equipment;
determining whether or not the power generated by the fuel cell is able to achieve the target generating power; and
when the power generated by the fuel cell is determined to be unable to achieve the target generating power, stopping increasing the pressure of the reactant gas over time, and then stopping increasing the flow of the reactant gas over time.

15. The method according to claim 13, further comprising:
setting a target generating power of the fuel cell;
increasing the target generating power in accordance with power consumed by the power consuming equipment;
determining whether or not the power generated by the fuel cell is able to achieve the target generating power;
when the power generated by the fuel cell is determined to be unable to achieve the target generating power, decreasing the target generating power; and
when the target generating power is decreased, first decreasing the pressure of the reactant gas over time, then stopping the heater from heating the coolant, and then decreasing the flow of reactant gas over time.

16. The method according to claim 13, wherein the power consuming equipment further includes a power storage device adapted to be charged by power generated by the fuel cell, the method further comprising:
starting to charge the power storage device after the heating device starts heating the coolant; and
after the charging of the power storage device is started, increasing the pressure of the reactant gas over time.

17. The method according to claim 11, further comprising:
increasing the target generating power of the fuel cell from a lower generating power limit to an upper generating power limit;
wherein the lower generating power limit is set to a minimum value required for power generation by the fuel cell; and
wherein the upper generating power limit is set to a maximum value for power generation performance of the fuel cell system.

18. The method according to claim 11, further comprising:
increasing the target generating power of the fuel cell from a lower generating power limit to an upper generating power limit;
wherein the lower generating power limit is set to a minimum value required for power generation by the fuel cell; and
wherein the upper generating power limit is set to the sum of the lower target generating power limit and a maximum consuming power of the power consuming equipment.

19. A fuel cell system comprising:
a fuel cell configured to cause reactant gas to be electrochemically reacted to generate electrical power when the reactant gas is supplied to the fuel cell;
power consuming means operable to consume electrical power generated by the fuel cell, the power consuming means including reactant gas supply means configured to supply the reactant gas to the fuel cell and heating means configured to heat coolant supplied to the fuel cell; and
control means for controlling operation of the fuel cell;
wherein during a warm-up operation, the reactant gas supply means starts a flow of the reactant gas such that the reactant gas supply means consumes power, and the reactant gas supply means increases the flow of the reactant gas over time such that the power consumed by the reactant gas supply means increases over time; and
wherein after the reactant gas supply means starts to consume a predetermined power increased by the increased flow of the reactant gas, the heating means starts heating the coolant supplied to the fuel cell such that the heating means consumes power.

* * * * *